June 24, 1930.    D. J. LITCHFIELD    1,767,686
EXPANSIBLE BEATER WHEEL
Filed April 20, 1928
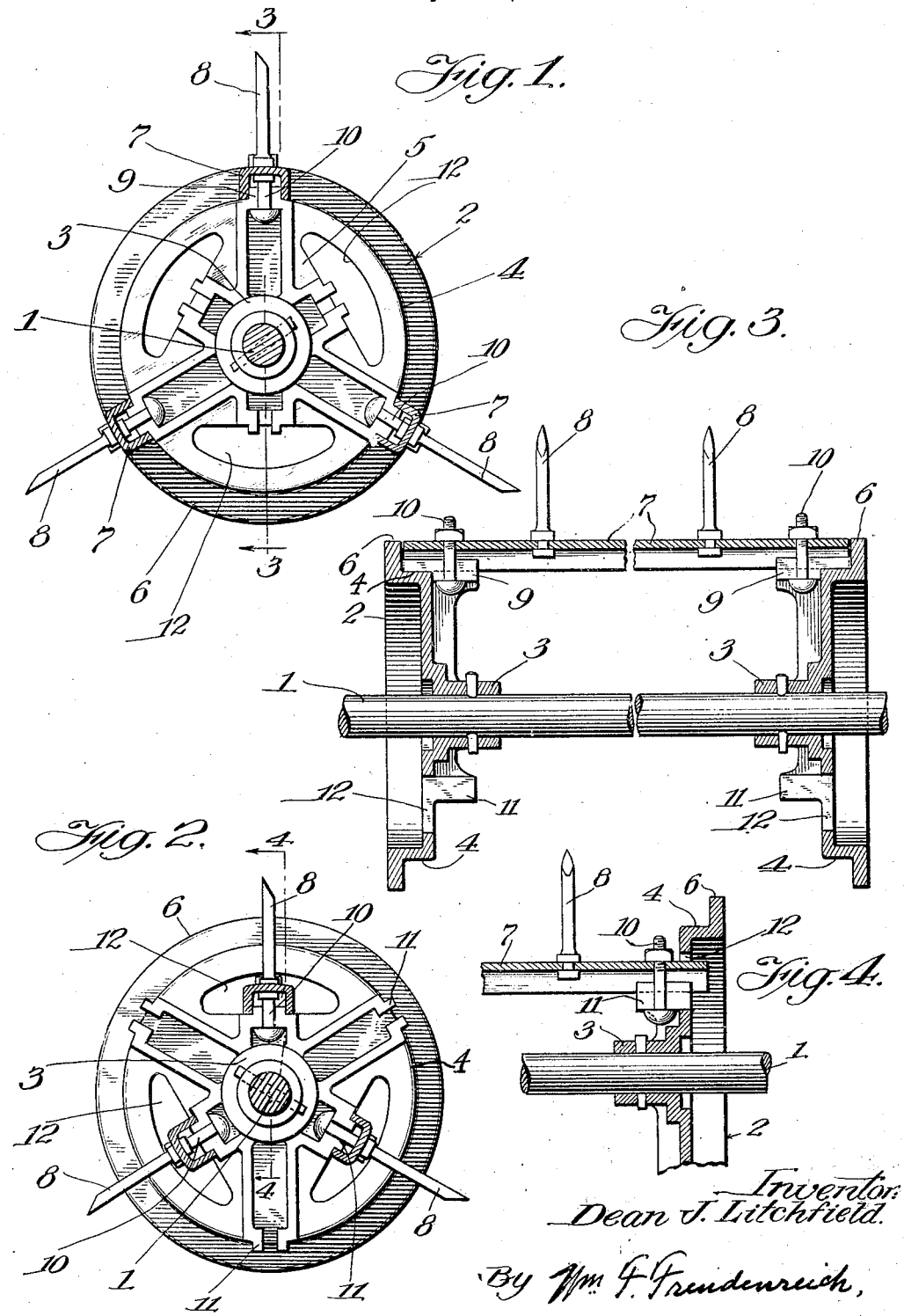
Inventor
Dean J. Litchfield.
By Wm. F. Freudenreich,
Atty.

Patented June 24, 1930

1,767,686

UNITED STATES PATENT OFFICE

DEAN J. LITCHFIELD, OF WATERLOO, IOWA

EXPANSIBLE BEATER WHEEL

Application filed April 20, 1928. Serial No. 271,448.

It is common practice, in manure spreaders, to employ two beater wheels, one to act on the upper portion of the load and the other on the lower portion. Beater wheels consist of cores from which project radial fingers. If the core of the beater wheel is small in diameter, and manure containing long straw is being distributed, the individual straws will wrap themselves around the core; the result being that the core will become covered with a layer of straw, wrapped about the same, to a depth perhaps as great as the length of the teeth, preventing the beater wheel from performing its intended functions. On the other hand, if the core be sufficiently large in diameter, the straws will not wrap themselves about the same. However, when manure containing very little straw is being distributed from a spreader having such a large upper beater wheel, the latter throws more or less of the manure forward upon the driver and the horses. Moreover, a larger upper beater wheel is not required when soft strawless manure is being distributed, because the load cannot be built high and by far the greater portion may be handled by the lower beater wheel.

The object of the present invention is to produce a simple and novel construction that may be used as the upper beater wheel in a manure spreader without being open to either of the objections just enumerated.

Beater wheels are usually formed of circular heads fixed upon a shaft, and bars carrying teeth and spanning the distance between the heads; the bars being bolted to the heads. Consequently the bars form the core or body around which straws will wrap if the bars are too close together. In carrying out my invention, I so construct the heads that the bars may be supported at such a distance from the shaft as to produce a beater wheel of large diameter or, if desired, at a shorter distance, so as to produce a beater wheel of small diameter. The farmer may therefore adapt the beater wheel to the particular conditions existing at any given time.

Therefore, viewed in one of its aspects, the present invention may be said to have for its object to produce a simple and novel beater wheel that may be adjusted to form either a wheel of large diameter or one of small diameter.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figures 1 and 2 are transverse sections through a beater wheel arranged in accordance with my invention, showing the bars in two different positions; Fig. 3 is a longitudinal central section taken approximately on line 3—3 of Fig. 1; and Fig. 4 is a section taken on line 4—4 of Fig. 2.

Referring to the drawing, 1 represents the usual or any suitable supporting shaft on which are fixed two circular heads 2, 2. The two heads are alike, so that a description of one will suffice for both. It will be seen that each head consists of a hub 3, a rim 4, and a web 5 between the hub and the rim. On the outer side of each rim is a radially-projecting flange 6. The bars 7, carrying the teeth 8, are placed between the two heads, with their ends resting on the rims. There are brackets 9 on the inner sides of the webs, and the bars are secured in place by means of bolts 10 passing through the bars and the brackets. In the arrangement shown, there are three bars, and consequently three brackets spaced 120° apart.

When the bars are secured to the heads in the manner just described, namely as shown in Figs. 1 and 3, the beater wheel is at its maximum diameter. When a small beater wheel is desired, the bars must be moved closer to the center. I have therefore provided a second set of brackets 11, similar to the brackets 9, but placed close to the hub of each head. These brackets are also spaced 120° apart, but they are so disposed as to alternate with the brackets 9. Outwardly beyond each of the brackets 11 is a window 12 formed in the web of the corresponding head; this window permitting the adjacent end of a bar resting on the bracket to extend through the web. In other words, the bars are longer than the distance between the web portions of the heads, since they are adapted to rest on the rims, and therefore openings in the webs must be provided for the ends of the bars when the latter are laid on the brackets 11 as shown in Figs. 2 and 4. The same bolts that are used to fasten the bars to the brackets 9 serve to hold the bars to the brackets 11, so that no extra parts are required to change the beater wheel from one diameter to another.

It will thus be seen that in the case of a beater wheel having three bars, the farmer need only take out six bolts in order to permit the bars to be shifted from one position to another; fastening the bars again with these same bolts after they have been shifted. In other words, without the use of any additional parts that might be lost or mislaid, the farmer may quickly change his upper beater wheel so as to be able to distribute manure containing considerable straw with a large beater wheel, and to distribute soft heavy manure with a beater wheel of small diameter. Consequently he is not annoyed by reason of being required to cut away the straw packed on his beater wheel in the one instance, or by having manure thrown upon himself and the horses in the other instance.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. In a beater wheel, a shaft, spaced heads on the shaft, bars having thereon laterally projecting teeth, and a plurality of sets of seats on the heads for receiving and supporting the ends of said bars, said sets of seats being located at different radial distances from the shaft.

2. In a beater wheel comprising heads spaced apart from each other and toothed bars extending between the heads, a plurality of sets of seats disposed on the heads at different radial distances from the axis of rotation of the wheel, the seats of each set being constructed and arranged to receive the ends of said bars and support the bars.

3. In a beater wheel, a pair of spaced circular heads, each head being provided on the inner side with two sets of seats facing away from the axis of the beater wheel, the seats of each set being at equal distances from said axis and the seats of one set being farther away from the axis than those of the other set, a set of bars provided with projecting teeth, each bar being long enough to extend between and be supported by the corresponding seats of either set, and means for securing each bar to the seats on which it rests.

In testimony whereof, I sign this specification.

D. J. LITCHFIELD.